United States Patent [19]
Ueda et al.

[11] Patent Number: 5,995,986
[45] Date of Patent: Nov. 30, 1999

[54] PRINTING CHARACTERISTIC DISPLAY EQUIPMENT FOR DISPLAYING IMAGE DATA ON A DISPLAY ALLOWING THE USER TO DETERMINE PRINTING CHARACTERISTICS USING PRINT CHARACTERISTIC MARKERS WITHOUT HAVING TO PRINT THE IMAGE

[75] Inventors: Masashi Ueda; Ryohei Komiya, both of Nagoya, Japan

[73] Assignee: Brother Kogyo Kabushiki Kaisha, Nagoya, Japan

[21] Appl. No.: 08/805,138

[22] Filed: Feb. 24, 1997

[30] Foreign Application Priority Data

Feb. 23, 1996 [JP] Japan .................................. 8-036763

[51] Int. Cl.⁶ .................................................. G06F 17/21
[52] U.S. Cl. ........................... 707/516; 345/112; 707/526
[58] Field of Search ..................................... 707/515, 527, 707/1, 516, 526; 395/117; 358/449; 345/112

[56] References Cited

U.S. PATENT DOCUMENTS

| | | | |
|---|---|---|---|
| 5,208,905 | 5/1993 | Takakura et al. ........................ | 707/515 |
| 5,459,819 | 10/1995 | Watkins et al. ........................... | 395/117 |
| 5,608,542 | 3/1997 | Krahe et al. .............................. | 358/449 |
| 5,715,441 | 2/1998 | Atkinson et al. ........................... | 707/1 |
| 5,717,940 | 2/1998 | Peairs ...................................... | 707/515 |
| 5,778,403 | 7/1998 | Bangs ...................................... | 707/527 |

FOREIGN PATENT DOCUMENTS 7-236066 9/1995 Japan ............................... G06F 17/21

OTHER PUBLICATIONS

"The Juggler; image enhancement and file conversion software from Jewell Technologies Inc." Software Magazine. (Dec. 1, 1991) vol. 11, No. 15, p. 107.

Primary Examiner—James P. Trammell
Assistant Examiner—John Leonard Young
Attorney, Agent, or Firm—Oliff & Berridge, PLC

[57] ABSTRACT

Printing format display equipment for displaying image data on a CRT display. The image data includes different parts with varying printing formats, and for reading printing formats for different areas of the image data from the image data itself and displaying those printing formats on the CRT display at positions corresponding to the different areas of the image data, which is already being displayed on the CRT display, allowing the user to accurately determine the printing formats without having to actually print the image.

15 Claims, 8 Drawing Sheets

| FIRST PRINTING FORMAT | | SECOND PRINTING FORMAT | |
|---|---|---|---|
| TEXT | DISPLAY MARK | TEXT | DISPLAY MARK |
| ERROR DIFFUSION |  | SATURATED |  |
| DITHERING (Bayer) |  | MONITOR COLOR |  |
| DITHERING (Rotated) |  | LUMINESCENT |  |
| SIMPLE BINARY |  | NO COLOR CORRECTION |  |

PRINTING CHARACTERISTIC DISPLAY EQUIPMENT FOR DISPLAYING IMAGE DATA ON A DISPLAY ALLOWING THE USER TO DETERMINE PRINTING CHARACTERISTICS USING PRINT CHARACTERISTIC MARKERS WITHOUT HAVING TO PRINT THE IMAGE

BACKGROUND OF THE INVENTION

1. Field of the Invention

The present invention relates to printing format display equipment for displaying image data that is intended to be printed and that contains different parts with varying printing formats.

2. Description of the Prior Art

The advancement of computer-aided desk top publishing (hereinafter referred to as DTP) in recent years now allows users to create complex documents combining various types of visual data, including photographic images, business graphics such as charts and graphs, and expanded or shrunken text.

However, when color correction is performed on color output sent to the printer in order to accurately print a color image and retain the same printing formats (or printing properties) as set in the document, the printing formats output are sometimes faded in comparison to the graphics in the document, and the graphics lose some of their impact. Sometimes the life-like appearance of photographic images is lost when performing color correction on highly saturated, vivid colors sent to the printer.

Towards this problem, recent achievements have been made that allow different parts of the same document to be appropriately expressed by setting the printing formats for each part of the image data. A technology has been proposed (Japanese Laid-Open Patent Publication HEI-7-236066) In which the printing formats can be set manually for each part of the document, or printing formats appropriate for each part of a document can be set automatically through a computer process.

A reliable way to check the printing condition of data set in the manner described above is to print the document out, but this trial-and-error method of verification can be a waste of printing time, paper, ink, and the like. To avoid this waste, users display their documents on a CRT or similar type display and verify the printing conditions on the screen before actually printing the document. However, CRT displays use an additive color mixing process, while printers use a subtractive color mixing process, making it impossible to accurately verify the printing conditions in this way.

Although users might be certain of printing conditions for image data set entirely by themselves, much of the image data is set by people other than the user. Furthermore, when settings are made automatically by a computer as described above, no one knows what settings have been made, potentially leading to further misunderstanding.

In DTP, multiple image data is created using various software programs and then combined to create one document.

However, if the user does not understand or forgets what printing settings have been made when creating a document, he or she cannot accurately verify the printing settings, even if it was the user who set the printing formats.

SUMMARY OF THE INVENTION

It is an object of the present invention to simplify the verification of printing characteristics in a document that has been edited using a DTP application program or the like.

To achieve the above and other objects, there is provided a printing format display equipment that includes display means for displaying an image consisting of a plurality of parts, varied printing formats being set to the plurality of parts of the image; and reading means for reading the varied printing formats for the plurality of parts of the image from the image data, wherein the display means further displays the varied printing formats read by the reading means.

Modifying means is further provided for modifying the varied printing formats displayed on the display means and changing the varied printing formats to modified varied printing formats.

The printing formats for the plurality of parts of the image read from the image data are displayed at positions corresponding to respective parts of the image being displayed on the display means.

The printing formats are displayed on the display in the form of symbols that correspond to the printing formats.

According to another aspect of the invention, there is provided a printing format display equipment that includes a display; image storing means for storing image data targeted for printing; display control means for converting the image data stored in the image storing means into displayable image data and displaying the image data on the display; and printing format display control means for extracting printing format data set in each part of the image data stored in the image storing means, converting the image data to displayable image data, and displaying the image data on the display.

Revision input means is further provided for allowing modification operations to be performed on displayed printing formats, and also printing format modification means is provided for modifying the printing formats of the relative part within the image data based on modification data input via the revision input means.

The printing format display control means displays converted printing format data at positions corresponding to the parts of the image data already displayed on the display.

According to still another aspect of the invention, there is provided a document processing device that includes composing means for composing plural pieces of document data into combined document data for one page, the plural pieces of document data containing varied printing formats; display means for displaying images corresponding to the combined document data; analyzing means for analyzing the varied printing formats, wherein the display means displayed the varied printing formats analyzed by the analyzing means; and modifying means for modifying the varied printing formats displayed on the display means and changing the varied printing formats which are subjected to modification by the modifying means.

The printing formats analyzed by the analyzing means are displayed at a position corresponding to the respective part of the combined document data being displayed on the display means.

According to still another aspect of the invention, there is provided a document processing device that includes composing means for composing plural pieces of document data into combined document data for one page, the plural pieces of document data containing varied printing formats; a display; image storing means for storing the combined document data for printing; display control means for converting the document data stored in the image storing means into displayable document data and displaying the document data on the display; and printing format display control means for extracting printing format data set in each of the plural pieces of the document data, converting the document data to displayable document data, and displaying the document data on the display.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A document processing device including a printing format display equipment according to preferred embodiments of the present invention will be described while referring to the accompanying drawings.

Figure 1:
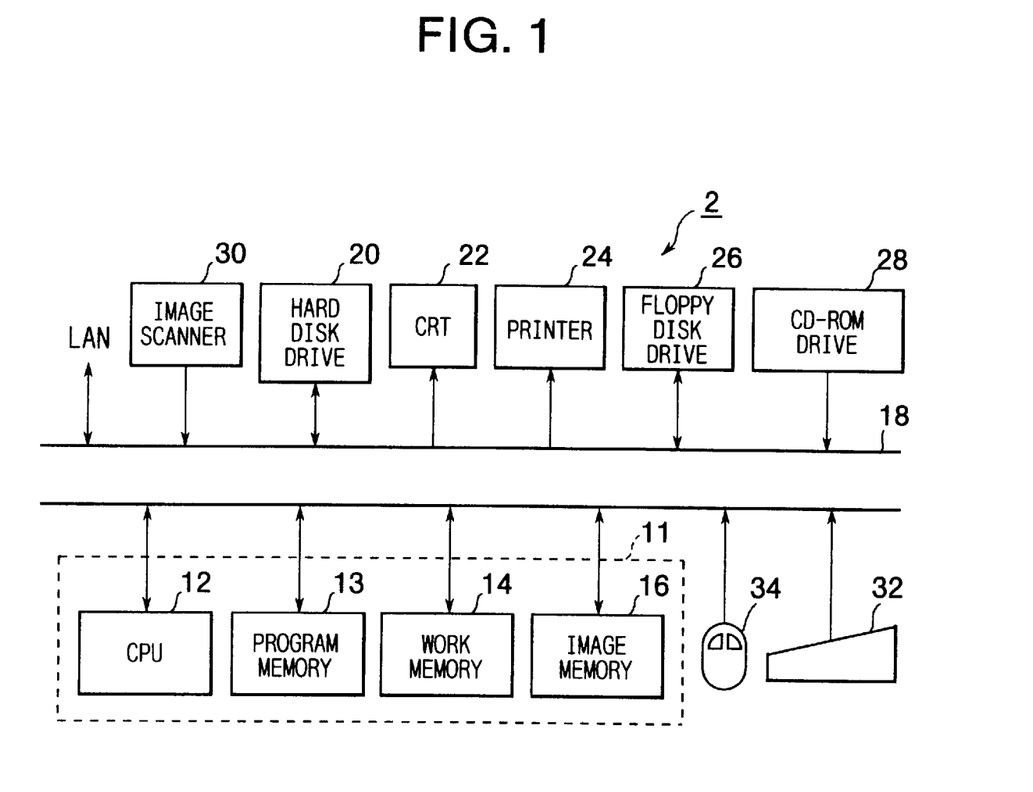
FIG. 1 is a block diagram showing the principal parts of printing format display equipment of the first embodiment.

In the following description related to the first embodiment, printing format display equipment 2 of the present invention will be described with reference to FIG. 1.

A microcomputer 11 forms the main component of the printing format display equipment 2 and includes a CPU 12; a program memory 13, which includes ROM memory; and a work memory 14 and video memory 16, which include RAM memory. A hard disk drive 20 for storing application programs, a CRT display 22, an ink-jet printer 24, a floppy disk drive 26, a CD-ROM drive 28, and an image scanner 30 are connected to the microcomputer 11 via a bus 18. A LAN or other type of communication network is also connected to the bus 18 for transmitting and receiving document data. A user inputs data using a keyboard 32 or a mouse 34 connected to the printing format display equipment 2 via the bus 18.

The hard disk drive 20 stores various application software including a word processor; a photographic image editor; an illustration image editor; a business graphics program: a DTP application program for creating one document from a combination of text, photographic images, or illustrations created with this software; and execution programs for a plurality of applications used in the document editing and printing process shown in FIG. 2, which will be described later.

The CPU 12 is provided to start one or more of the application programs stored on the hard disk drive 20 after loading the programs into the program area of the work memory 14; to edit various data that has been loaded into the work memory 14; and to display the edited results on the CRT display 22 by storing the results as image data in the image memory 16. When the edited image data is to be printed, the image data is converted to printing image data corresponding to the printing formats set for each area of the image data. The printing image data is output to the ink-jet printer 24 and printed.

Application programs can also be used to edit various data, including character data, photographic image data, and business graphics data, that has been read from the hard disk drive 20, a floppy disk loaded in the floppy disk drive 26, a CD-ROM loaded in the CD-ROM drive 28, the image scanner 30, or the LAN or other communications network. As these application programs are common and have been described in Japanese Laid-Open Patent Publication HEI-7-236066, a description of them will be omitted here.

Next, a document editing and printing process that utilizes DTP application programs and is executed using the printing format display equipment 2 will be described with reference to the flowchart in FIG. 2.

At the beginning of the document editing and printing process, image data for the document is created (S100). Creation of this image data is accomplished by editing necessary image data with one or a plurality of application programs that have been loaded in the work memory 14.

The application programs are selected and started by positioning the mouse cursor on the CRT display 22 over the desired program and sending a click signal from the mouse input device 34.

After the application programs are selected and launched, image data input from the hard disk drive 20, the floppy disk drive 26, the CD-ROM drive 28, the image scanner 30, the LAN, or other storage device is written to the work memory 14. The input data is then converted: to image data that can be displayed on the CRT display 22 and is written to the video memory 16, displaying the data on the CRT display 22; or else new data is created and written to the video memory 16, displaying the data on the CRT display 22.

Next, application programs for editing photographic image data or illustration data are selected and started. With these programs, trimming can be performed on image data in the work memory 14 or the image memory 16; new data can be created; color conversion can be performed; multiple gradation data can be converted to binary data as a pseudo half-tone using a dither method or an error diffusion method; or color reduction can be performed for displaying the data on the CRT display 22. The new settings can then be stored together with the image data.

Once the application programs for creating documents are selected and started, these programs can be used to convert existing document data to character code data and stored in the work memory 14, to change character sizes and fonts, to change the layout and display the image data on the CRT display 22, or to store the above settings along with the image data.

Step 100 is finished when the editing of image data for a document, created using the various application programs described above, has been completed and the various image data is combined. This combined image data can then be stored on the hard disk drive 20, for example, or printed according to the printing formats set by the original application programs used to create each part of the document. The printing formats include formats for processing color conversions, such as luminescent or saturated, and formats for creating binary image data such as error diffusion and dithering. The combining and printing functions themselves are commonly known.

Figure 3:
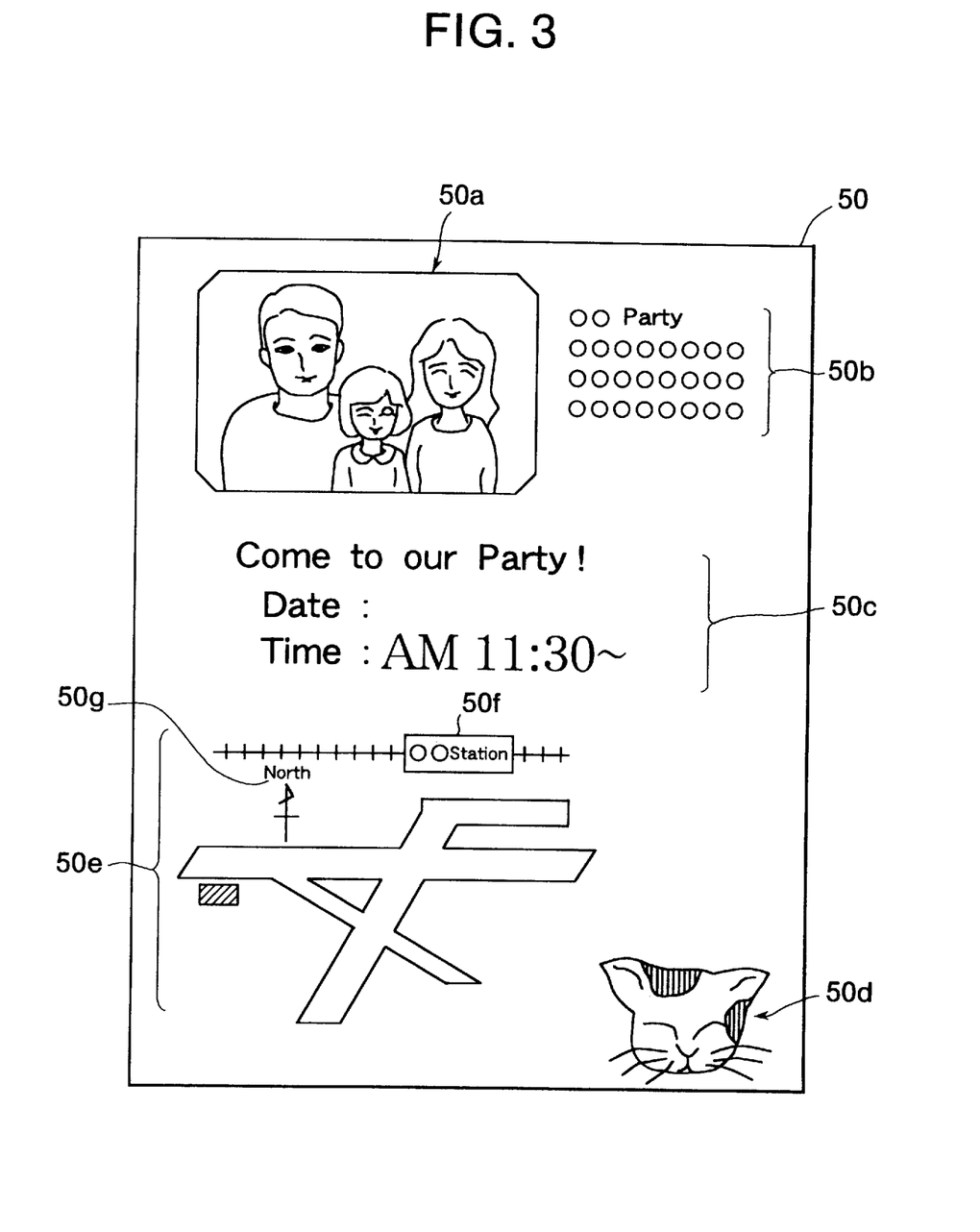
FIG. 3 is an illustration of various image areas arranged in a document of the first embodiment.

When the process described above, in which image data is edited using suitable application programs, is finished, document data such as a document image 50, shown in FIG. 3. will be complete. The document image 50 includes a photographic Image area 50a, character image areas 50b and 50c, an illustration image area 50d, and a map image area 50e. The map image area 50e itself includes character image areas 50f and 50g.

At this point, if the user chooses "print" from the selection menu using the mouse input device 34, the print command will be recognized (S110: yes), and the partial data corresponding to each of 50a–50e, which is set in the work memory 14, will be prescanned, and the two printing formats for each partial data will be analyzed (S120).

Figure 4:
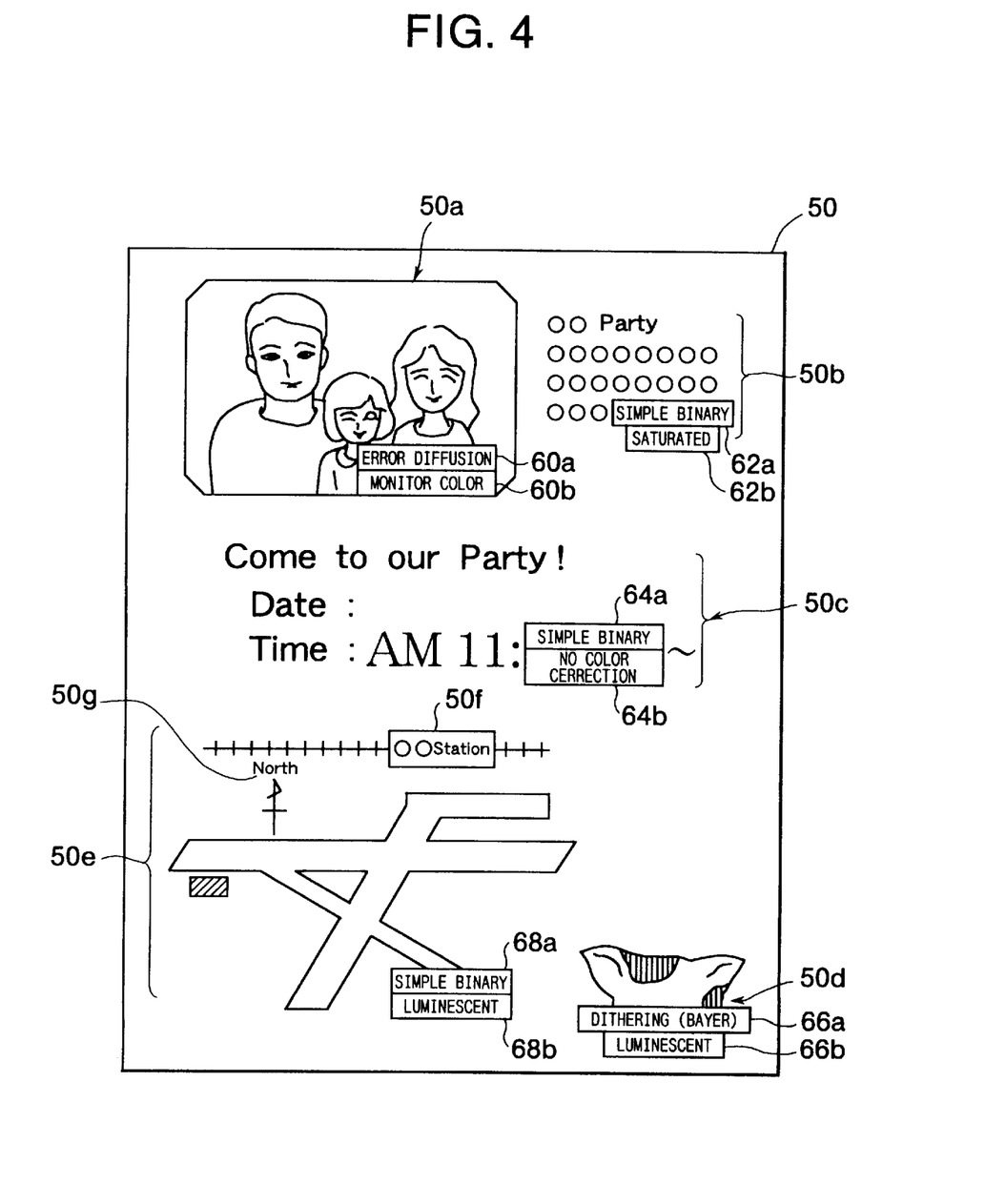
FIG. 4 is an illustration of various image areas and their printing formats in a document of the first embodiment.

Next, the two printing formats for each partial data are displayed on top of the corresponding image areas 50a–50e, as shown in FIG. 4 (S130). In the example shown in FIG. 4, the photographic image area 50a includes message boxes 60a and 60b for the printing formats "error diffusion" and "monitor color." respectively; the character image area 50b includes message boxes 62a and 62b for the printing formats "simple binary" and "saturated," respectively; the character image area 50c includes message boxes 64a and 64b for the printing formats "simple two-color" and "no color correction," respectively: the illustration image area 50d includes the message boxes 66a and 66b for the printing formats "dithering (Bayer)" and "luminescent," respectively; and the map image area 50e includes the message boxes 68a and 68b for the printing formats "simple two-color" and "luminescent," respectively. The display position of the message boxes is set based on display position data retrieved from each part of the image data and might be set, for example, to the lower right corner of each image area 50a–50e.

The first printing format in the message boxes, "error diffusion," "simple binary," and "dithering (Bayer)" in this example, represents the binary process for printing the image data. "Dither (rotated)" is another process that can be set for the first printing format. The second printing format in the message boxes, "monitor color," "saturated," "no color correction." and "luminescent" in this example, represent color conversion characteristics of the image data.

The process "error diffusion" sets ink injection for each picture element on or off according to an error diffusion method. "Simple binary" sets ink injection for each picture element on or off based only on a threshold value. "Dithering (Bayer)" gives each picture element a binary value based on the Bayer dithering matrix. "Dither (rotated)" gives each picture element a binary value based on the rotated dithering matrix. "Monitor color" indicates that color conversion should be performed to approximate the color on the monitor, that is, the CRT display 22. "Saturated" indicates that the saturation is to be increased. "No color correction" indicates that the image data values created by each application program should be used unchanged. "Luminescent" indicates that color conversion should be performed to increase the level of brightness.

If the current settings are not acceptable, the user moves the mouse cursor to the message box 60a–68a or 60b–68b that he or she wishes to change and clicks the left button of the mouse input device 34 (hereinafter abbreviated to "clicks the mouse"). Editing of the printing formats is determined not complete (S140: no), and a printing format selection menu is displayed (S150). The system then waits for the user to input a selection (S160).

Figure 5:
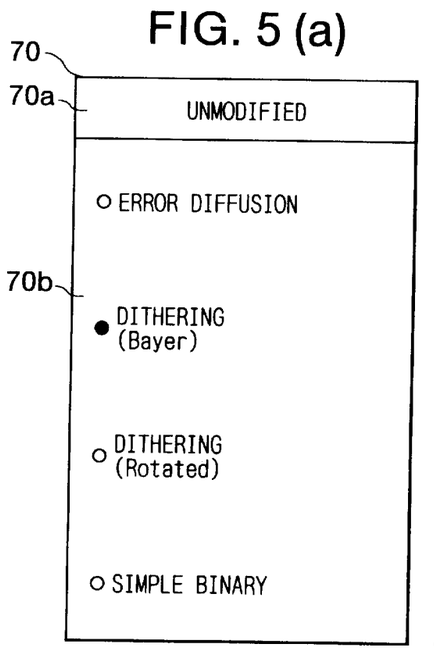
FIGS. 5(a) and 5(b) are illustrations of selection menus of the first embodiment before modifications have been made.

An example of a selection menu is shown in FIG. 5. FIG. 5(a) shows a menu box 70 for the first printing format displayed on top of the-illustration image area 50d. The menu box 70 is displayed when the user clicks the mouse on the message box 66a of the illustration image area 50d. The message "Unmodified" is displayed in an upper portion 70a of the menu box 70, because the first printing format of the illustration image area 50d has not been revised since it was set with the illustration editing program. A list of settings that can be chosen for the first printing format are displayed in a lower portion 70b of the menu box 70. A radio box in front of the currently selected printing format is filled in.

Figure 6:
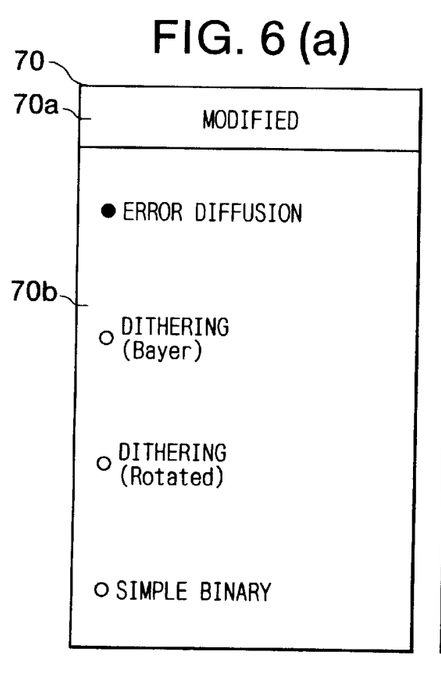
FIGS. 6(a) and 6(b) are illustrations of selection menus of the first embodiment after modifications have been made.

The current setting can be changed by clicking the mouse on the radio button in front of the desired selection or on the text of the selection itself. FIG. 6(a) shows the same menu box 70 after a new setting, in this case "error diffusion," was selected. Now, the radio button in front of "error diffusion" is filled in, while the radio button in front of "dithering (Bayer)," the previous setting, has been cleared. Also, the display in the upper portion 70a has changed to "Modified."

After a selection has been made (S160: yes), the printing format of the image data relevant to the selected area is modified to conform to the new setting (S162). Then, the processes in steps S120 and S130 are repeated with the new settings, and message boxes similar to those shown in FIG. 4 will be displayed on the CRT display 22 with the modified data. The menu box 70 may also be continuously displayed for further modifications.

FIG. 5(b) shows a menu box 72 for the second printing format displayed on top of the illustration image area 50d. The menu box 72 is displayed when the user clicks the mouse on the message box 66b of the illustration image area 50d. The message "Unmodified" is displayed in an upper portion 72a of the menu box 72, because the first printing format of the illustration image area 50d has not been revised since it was set with the application program for editing illustration image data. A list of settings that can be chosen for the first printing format are displayed in a lower portion 72b of the menu box 72. The method for changing selections is the same as for FIG. 5(a). For example, if the user changes the current setting for the second printing format from "luminescent" to "match color to monitor," the display in the upper portion 72a will change to "Modified," and the message boxes displayed on the CRT display 22 will reflect the changes.

Modifications to other areas of the document are done in the same way. When all modifications have been completed, the user clicks the mouse on a "Modifications completed" button (S140: yes), which is not shown in the diagrams but is displayed on the CRT display 22. All of the image data is then converted to image data for printing, in accordance with the printing formats set for each data area (S170).

Next, the printing process is performed by the ink jet printer 24 (S180), creating a printed image that reflects the modified printing characteristics.

Here, the user has a choice of clicking the mouse on an "End all processes" button (S190: end all), which is not shown in the diagrams but is displayed on the CRT display 22, ending the editing and printing process; clicking the mouse on an "Edit" button (S190: edit), not shown, which will return the process to step S100; or clicking the mouse on a "Print" button (S190: print), not shown, which will return the process to step S120.

The printing format display equipment 2 of the first embodiment displays image data on the CRT display 22 that is targeted for printing and that contains varied printing formats for different parts of the image. The printing format display equipment 2 also reads from the image data and analyzes the printing formats of each area 50a–50e (S120), which are the various parts of the image, and displays these printing formats at positions corresponding to each of the areas 50a–50e, which are already being displayed on the CRT display 22. In doing this, the user can accurately determine the printing formats for each of the image areas without printing the image and can immediately modify the printing format of any area to a desirable setting. Furthermore, the menu boxes 70 and 72, containing the printing formats, are displayed on the CRT display 22, allowing the user to immediately and efficiently modify the printing formats.

The printing formats for character image areas 50f and 50g of the map image area 50e share the same printing formats with the map image area 50e, but the printing formats of these areas 50f and 50g can be set and modified separately by distinguishing them from the other areas of the map image area 50e.

In the first embodiment, the work memory 14 corresponds to the image memory means: the operations for displaying images on the CRT display 22 using the various application programs of step S100 correspond to the display control means; the operations of steps S120 and S130 correspond to the printing format display control means; the mouse input device 34 corresponds to the revision input means; and the operations of step S162 correspond to the printing format modification means.

Figure 7:
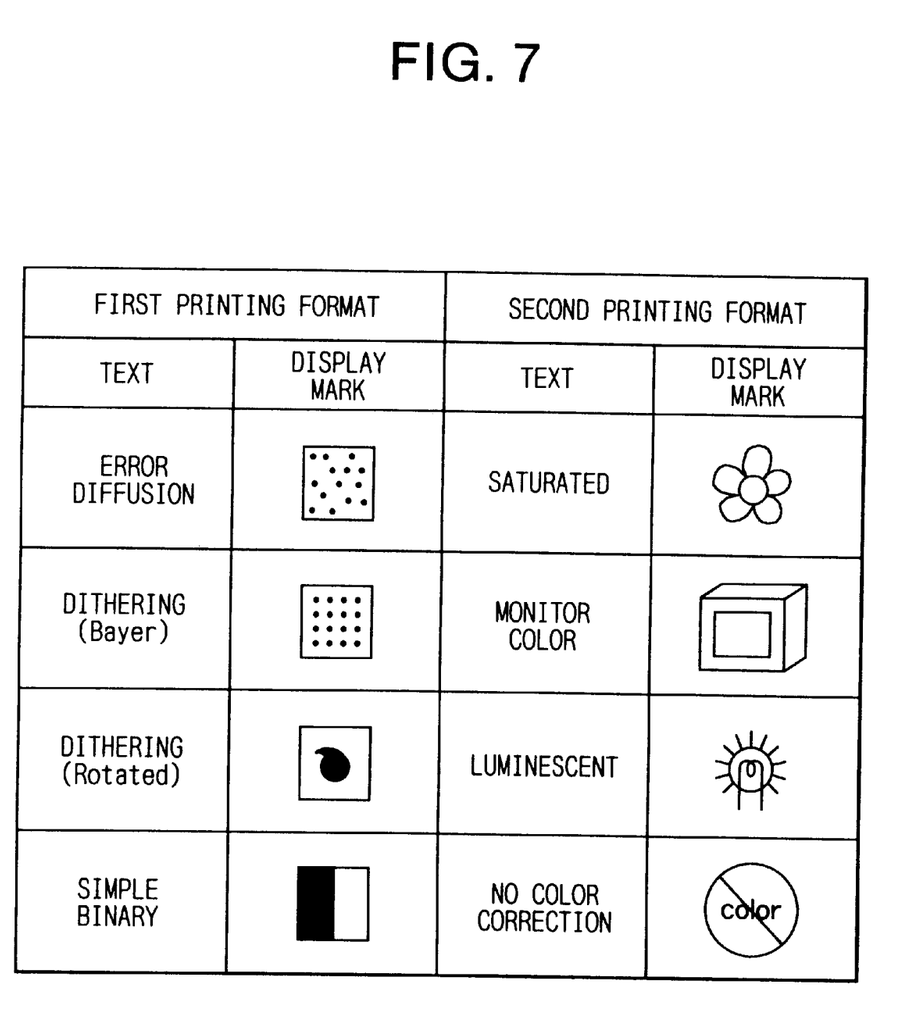
FIG. 7 is a diagram showing relationships between printing formats and display marks of the second embodiment.

In the second embodiment, display marks, or symbols, rather than the text characters of the first embodiment are used in the message boxes 60a–68a and 60b–68b to indicate printing formats, as shown in FIG. 7.

Figure 8:
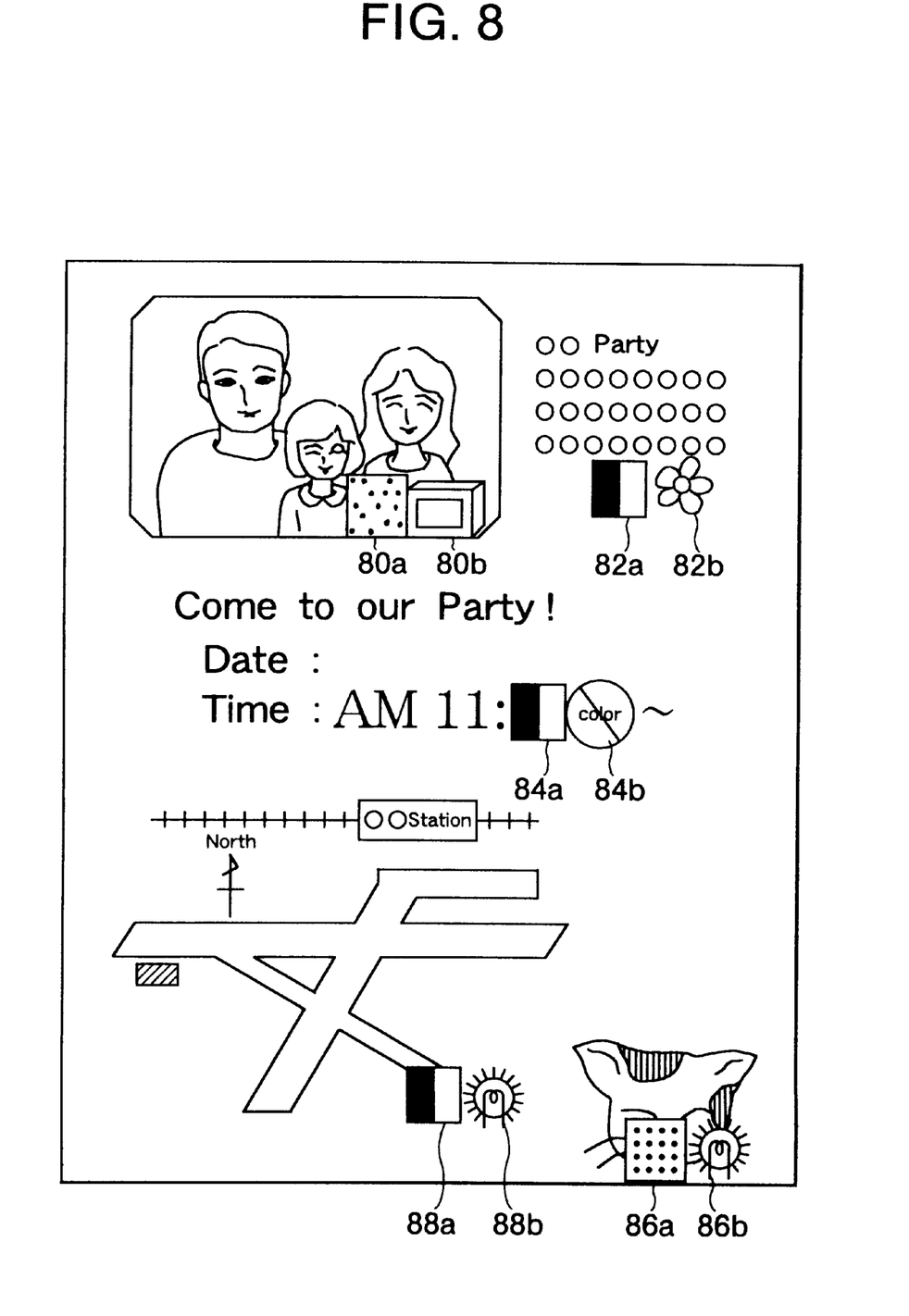
FIG. 8 is an illustration of various image areas and printing format display marks arranged in a document of the second embodiment.
Figure 9:
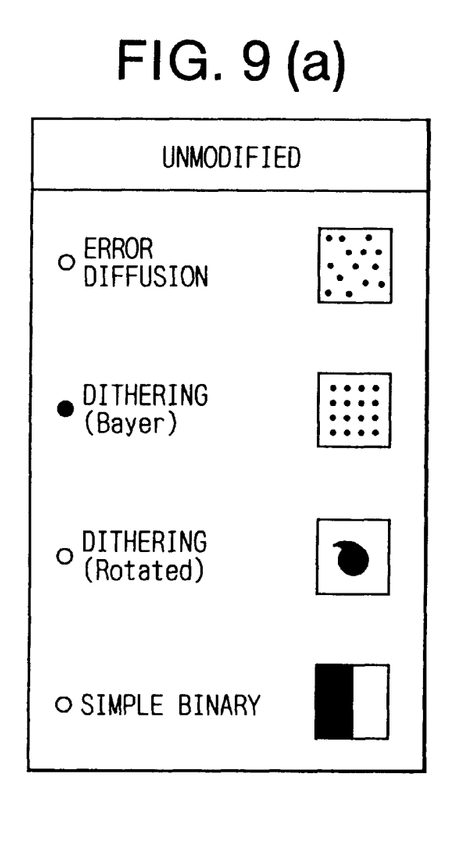
FIGS. 9(a) and 9(b) are illustrations of selection menus of the second embodiment.

FIG. 8 shows how the printing format message boxes of FIG. 4 are replaced by display marks 80a–88a and 80b–88b. With this method, the user can determine the printing formats intuitively from the patterns in display marks 80a–88a and 80 b–88b, without needing to read a description. Clicking the mouse on one of the display marks 80a–88a or 80b–88b will execute the same operations described in the first embodiment when clicking the mouse on the message boxes 60a–68a and 60b–68b. In addition, display marks are combined with text descriptions in the menu boxes 70 and 72, as shown in FIG. 9.

In the embodiments described above, the printing formats are displayed using either message boxes 60a–68a and 60b–68b or display marks 80a–88a and 80b–88b. Selection menus are first displayed when the user clicks the mouse on these message boxes 60a–68a and 60b–68b or display marks 80a–88a and 80b–88b. However, the process for displaying message boxes 60a–68a and 60b–68b and display marks 80a–88a and 80b–88b of step 6130 can be omitted if selection menus are displayed from the beginning.

The message boxes 60a–68a and 60b–68b and display marks 80a–88a and 80b–88b have been positioned on top of and in the lower right corner of each image area 50a–50e, but the message boxes 60a–68a and 60b–68b and display marks 80a–88a and 80b–88b can be positioned elsewhere inside or outside the image areas 50a–50e, providing the correspondence between the printing formats and the image areas 50a–50e are clear. This correspondence can be achieved by connecting the image areas 50a–50e to their corresponding message boxes 60a–68a and 60b–68b or display marks 80a–88a and 80b–88b with a line or by inserting a note. The message boxes 60a–68a and 60b–68b or display marks 80a–88a and 80 b–88b can also be positioned adjacent to their corresponding image areas 50a–50e. The printing formats of an image area 50a–50e specified with the mouse input device 34 or other device can be displayed at a specific position that has been previously determined.

In the embodiments described above, the printing formats were set for each image area, but the settings could also be performed on groups of image areas. For example, all character image data could be made one group, illustration image data another group, and photographic image-data another group; message boxes or display marks or selection menus could be displayed for each group; and the printing formats for all image data of a group could be modified at one time.

Groups of image data could also be formed based on the application program used to create the image data. Then, message boxes or display marks or selection menus could be displayed for each group, and the printing formats for each group could be modified at one time.

Figure 2:
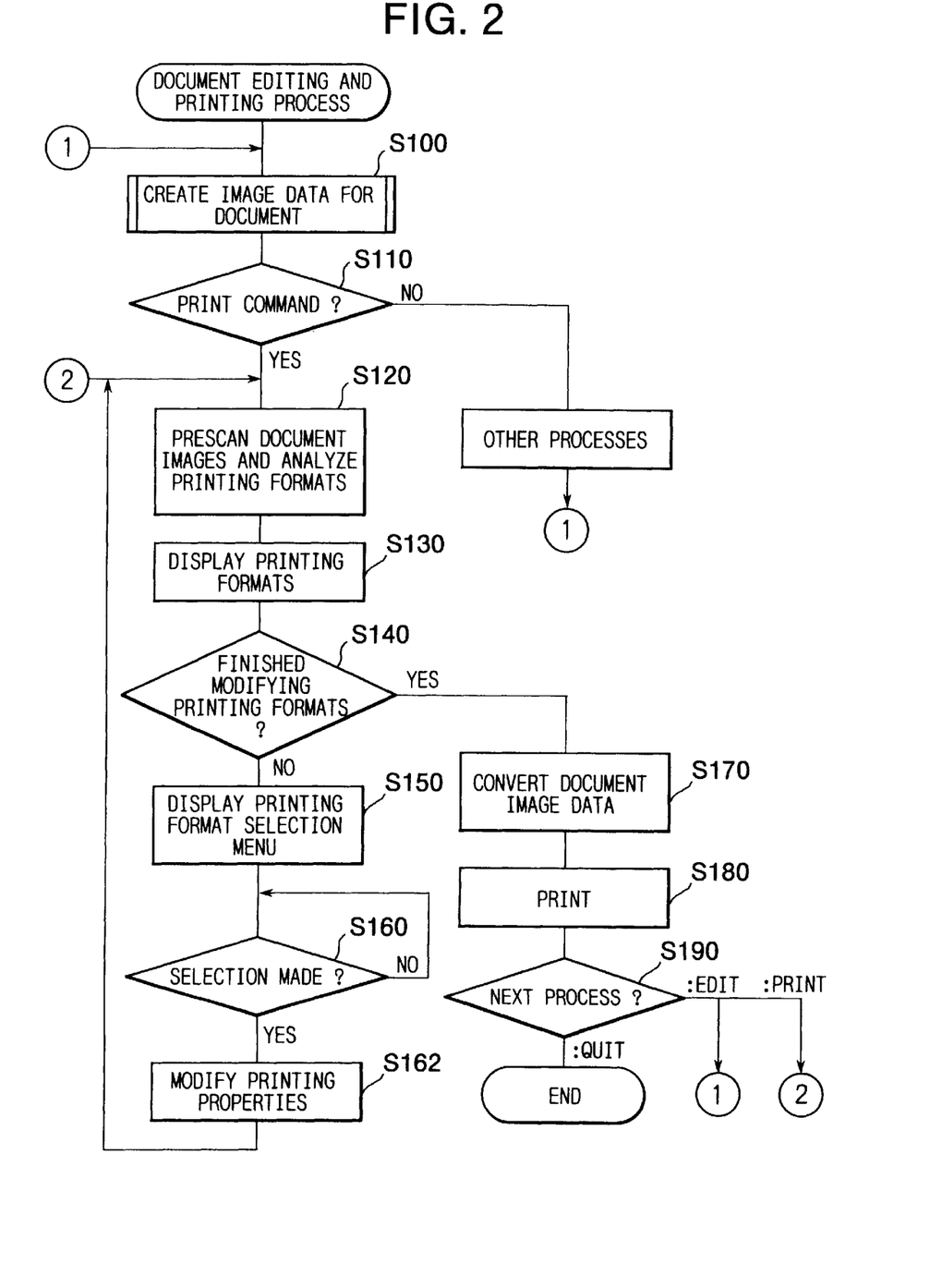
FIG. 2 is a flowchart of a document editing and printing process of the first embodiment.

In the embodiments described above, the document editing and printing process shown in FIG. 2 allowed the direct modification of printing formats. However, this process can be altered to simply display printing formats. With this method, if the printing formats displayed are determined unsatisfactory, the process returns to the application program step (S100). Thus, the same functions are achieved by modifying printing formats with the application programs.

The printing formats are not restricted to the examples given in the embodiments, but may include other types of printing format selections, such as other types of dithering, dither matrix values, resolution, binary-coding methods, types of binary-coding formats, halftone representation methods, color matching properties, and color conversion methods.

What is claimed is:

1. A printing characteristic display equipment comprising:
   display means for displaying an image consisting of a plurality of parts, varied printing characteristics being set to image data of the plurality of parts of the image; and
   reading means for reading the varied printing characteristics for the plurality of parts of the image from the image data,
   wherein said display means further displays the varied printing characteristics read by said reading means.

2. The printing characteristic display equipment according to claim 1, further comprising modifying means for modifying the varied printing characteristics displayed on said display means and changing the varied printing characteristics to modified varied printing characteristics.

3. The printing characteristic display equipment according to claim 1, wherein the printing characteristics for the plurality of parts of the image read from the image data are displayed at positions corresponding to respective parts of the image being displayed on said display means.

4. The printing characteristic display equipment according to claim 1, wherein the printing characteristics are displayed on said display in the form of symbols that correspond to the printing characteristics.

5. A printing characteristic display equipment comprising:
   a display;
   image storing means for storing image data targeted for printing;
   display control means for converting said image data stored in said image storing means into displayable image data and displaying said image data on said display; and printing characteristic display control means for extracting printing characteristic data set in each part of said image data stored in said image storing means, converting said printing characteristic data indicative of image reproduction to displayable printing characteristic data, and displaying said displayable printing characteristic data on said display.

6. The printing characteristic display equipment according to claim 5, further comprising:

revision input means for allowing modification operations to be performed on displayed printing characteristics; and printing characteristic modification means for modifying the printing characteristics of the relative part within said printing characteristic data based on modification data input via said revision input mean.

7. The printing characteristic display equipment according to claim 5, wherein said printing characteristic display control means displays converted printing characteristic data at positions corresponding to the parts of said printing characteristic data already displayed on said display.

8. The printing characteristic display equipment according to claim 5, wherein said printing characteristic display control means displays the printing characteristics on said display in the form of symbols corresponding to the printing characteristics.

9. A document processing device comprising:

composing means for composing plural pieces of document data into combined document data for one page, said plural pieces of document data containing varied printing characteristics;

display means for displaying images corresponding to the combined document data;

analyzing means for analyzing the varied printing characteristics, wherein said display means displayed the varied printing characteristics analyzed by said analyzing means; and modifying means for modifying the varied printing characteristics displayed on said display means and changing the varied printing characteristics which are subjected to modification by said modifying means.

10. The document processing device according to claim 9, wherein the printing characteristics analyzed by said analyzing means are displayed at a position corresponding to the respective part of the combined document data being displayed on said display means.

11. The document processing device according to claim 9, wherein the printing characteristics are displayed on said display in the form of symbols that correspond to the printing characteristics.

12. A document processing device comprising:

composing means for composing plural pieces of document data into combined document data for one page, said plural pieces of document data containing varied printing characteristics;

a display;

image storing means for storing the combined document data for printing;

display control means for converting said document data stored in said image storing means into displayable document data and displaying said document data on said display; and printing characteristic display control means for extracting printing characteristic data set in each of the plural pieces of the document data, converting the printing characteristic data indicative of image reproduction to displayable printing characteristics data, and displaying said displayable printing characteristic data on said display.

13. The document processing device according to claim 12, further comprising:

revision input means for allowing modification operations to be performed on displayed printing characteristics; and printing characteristic modification means for modifying the printing characteristics of the relative part within said document data based on modification data input via said revision input means.

14. The document processing device according to claim 13, wherein said printing characteristic display control means displays converted printing characteristic data at positions corresponding to the parts of said document data already displayed on said display.

15. The document processing device according to claim 14, wherein said printing characteristic display control means displays the printing characteristics on said display in the form of symbols corresponding to the printing characteristics.

* * * * *